United States Patent [19]

Reinicker et al.

[11] 4,342,335

[45] Aug. 3, 1982

[54] HYDRAULIC VALVE DETENT MECHANISM

[75] Inventors: Donald C. Reinicker, Waukesha; Daniel J. Radcliffe, Menomonee Falls, both of Wis.

[73] Assignee: Koehring Company, Brookfield, Wis.

[21] Appl. No.: 199,816

[22] Filed: Oct. 23, 1980

[51] Int. Cl.³ .................. F16K 11/14; F16K 31/00
[52] U.S. Cl. .................. 137/636.2; 91/465; 74/527; 74/531; 137/596; 137/625.6; 137/868; 251/65; 251/297
[58] Field of Search .............. 137/596, 596.1, 625.6, 137/636, 636.2, 868; 251/26, 297, 65, 25; 91/465; 74/527, 531, 529

[56] References Cited

U.S. PATENT DOCUMENTS

| | | | |
|---|---|---|---|
| 3,698,415 | 10/1972 | Forster et al. | 137/102 |
| 3,766,944 | 10/1973 | Distler | 137/625.6 |
| 4,184,512 | 1/1980 | Pignolet | 137/596 |
| 4,296,773 | 10/1981 | Harshman | 137/636.2 |

FOREIGN PATENT DOCUMENTS

| | | | |
|---|---|---|---|
| 2236101 | 7/1973 | France | 137/596 |
| 1494400 | 12/1977 | United Kingdom | 137/596 |
| 1549195 | 7/1979 | United Kingdom | 137/596 |

Primary Examiner—George L. Walton

[57] ABSTRACT

A hydraulic pilot valve having an improved detent mechanism. The pilot valve includes a pair of lever operated plunger members which operate sliding valve members to control the opening and closing of a pair of work ports. Biasing members urge the plunger members to an extended position so as to maintain contact with the lever, and a pair of detent mechanisms act to hold the respective plunger members in the extended position. Movement of the lever to depress either of the plunger members and thus operate the respective valve members to open either of the work ports allows the respective biasing member to move the other plunger member to its extended position where it is held in place by its respective detent mechanism, thus holding the lever in its cocked position.

1 Claim, 1 Drawing Figure

HYDRAULIC VALVE DETENT MECHANISM

BACKGROUND OF THE INVENTION

Typically a hydraulic pilot valve consists of a rectangular casing having a pair of side wall ports and a pair of base ports. One of the side wall ports connects the valve to a tank or reservoir of hydraulic fluid, while the other side wall port connects the valve to a source of pressurized hydraulic fluid. The two base ports are work ports which alternately supply pressurized hydraulic fluid to a hydraulic tool.

A pair of lever operated plunger valves control the communication of their respective work ports with either the tank port or the pressurized port. Depressing either of the plunger valves causes its respective work port to communicate with the pressurized port rather than the tank port.

During the operation of the hydraulic tool it is often necessary for the operator to depress a plunger valve via the lever and then remove his hand from the lever in order to operate other controls. In such a situation, it is often desirous to have the lever remain in its activated position rather than spring back to its neutral position.

In the past the lever has been held in position by applying restraints to the handle itself or by utilizing detent devices which engage the activated plunger.

However, handle restraints are cumbersome and awkward to engage and have proven to be unreliable while prior detent devices have been external to the valve itself thus making the control unit larger and changing its basic rectangular shape so as to prevent side-by-side installation of a series of valves.

SUMMARY OF THE INVENTION

The invention is directed to an improved detent mechanism for a hydraulic pilot valve having work ports which are selectively opened and closed by sliding valve members that are actuated by plungers operatively connected to the opposite sides of the base plate of a pivotable lever.

In accordance with the invention, a biasing member urges each plunger to an extended position so as to maintain continuous lever contact, and a detent connection acts to hold the respective plunger in the extended position.

Movement of the lever to depress or activate either of the plungers, and thus open either of the work ports, allows the respective biasing member to move the other plunger to its extended position where it is held in place by its respective detent connection, thus holding the lever in a cocked position.

The detent mechanism allows the operator to perform several operations simultaneously due to the fact that once a function and its corresponding lever position have been selected, the operator may remove his hand from the lever and tend to other controls and the detent mechanism will maintain the selected lever position until released either manually or automatically.

The location of the detent mechanism inside the valve housing also preserves the basic rectangular shape of the valve and thus allows the side-by-side placing of series of valves in a minimum amount of space.

DETAILED DESCRIPTION OF THE PREFERRED EMBODIMENT

Figure 1:
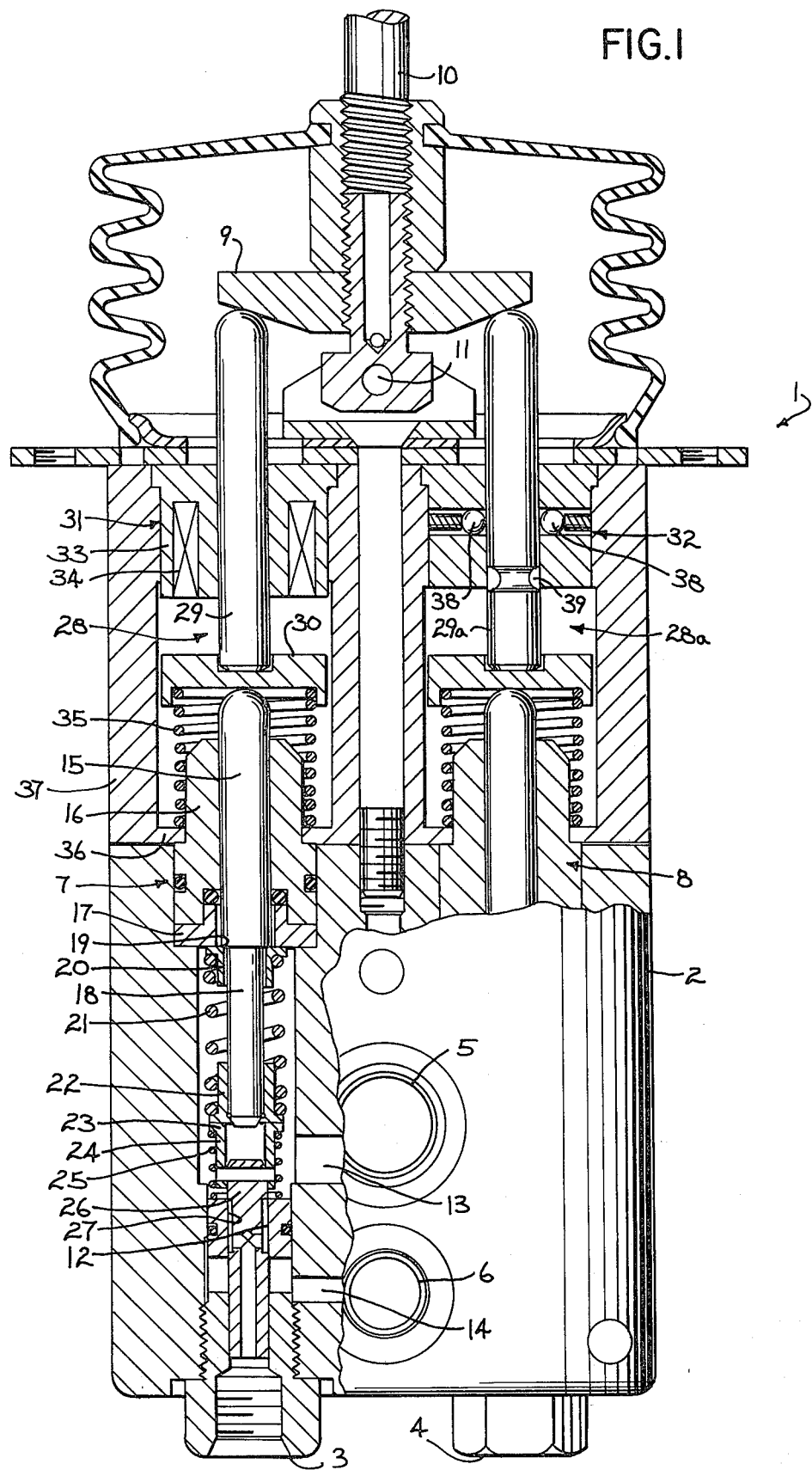
FIG. 1 is a side elevation with parts broken away of a hydraulic pilot valve incorporating the detent mechanism of the present invention.

The drawing illustrates a hydraulic pilot valve 1 having a detent mechanism. The pilot valve 1 includes a rectangular casing 2 having work ports 3 and 4 in its base for supplying pressurized hydraulic fluid to a hydraulic tool and having in its sidewall, tank port 5, connected to a reservoir of hydraulic fluid, and pressure port 6, connected to a source of pressurized hydraulic fluid.

Disposed within casing 2 are valve plunger assemblies 7 and 8 which are operatively connected to opposite sides of base 9 of control lever 10 which is pivotally connected to casing 2 by hinge pin 11. Operating plunger assemblies 7 and 8 operate to selectively connect the respective work ports 3 and 4 to either tank port 5 or pressure port 6.

In that valve plunger assemblies 7 and 8 are substantially identical, only valve plunger assembly 7 will be described in detail and it is to be understood that the same description may be applied to valve plunger assembly 8 and its respective work port 4.

Valve plunger assembly 7 operates to allow communication between work port 3 and either tank port 5 or pressure port 6. With valve plunger assembly 7 in its neutral or raised position, work port 3 communicates with tank port 5 via valve passage 12 and tank port passage 13. Depression of valve plunger assembly 7 by counter-clockwise movement of control lever 10 allows work port 3 to communicate with pressure port 6 via valve passage 12 and pressure port passage 14.

Valve assembly 7 consists of valve plunger 15 disposed within plunger capsule module 16 which is seated on retainer 17. Valve plunger 15 has a lower stem portion 18 which has a smaller diameter than the upper portion of plunger 15 thus forming shoulder 19 at the juncture of the upper and lower portions.

Shoulder 19 of valve plunger 15 engages the upper end of spring seat 20. The upper end of spring 21 engages the lower surface of spring seat 20 and urges it into contact with shoulder 19 while the lower end of spring 21 engages lower seat 22 and urges it into contact with shoulder 23 of spring seat 24. The upper end of spring 25 engages the lower surface of spring seat 24 and urges it into contact with spring seat 22 while the lower end of spring 25 engages a shuttle valve member 26.

Shuttle valve member 26 is slideably disposed in bore 27 and contains valve passage 12.

In the drawing plunger assembly 7 is shown in the neutral position which allows valve passage 12 to communicate with tank port passage 13. To bring work port 3 into communication with pressure port 6, control lever 10 is rotated counter-clockwise causing valve plunger member 15 to engage upper seat 20, and through spring 21 and lower seat 20, force shuttle valve member 26 to its lower position where valve passage 12 will communicate with pressure port passage 14.

Operating plunger assemblies 28 and 28a operatively connect the respective valve plunger assemblies 7 and 8 to base 9 of control lever 10. Operating plunger assemblies 28 and 28a are substantially identical and therefore only operating plunger assembly 28 will be described in detail.

Operating plunger assembly 28 consists of operating plunger 29 which extends through an opening in the top of casing 2 and engages one end of base 9 of control lever 10. The inner end of operating plunger 29 engages cap 30 which operably connects operating plunger 29 to valve plunger 15.

Detent mechanisms 31 and 32 operate to hold the respective operating plunger 29 and 29a in an extended position so that the respective plunger maintains contact with base 9 of lever 10.

Detent mechanism 31 consist of insert 33, which houses a magnet 34 having an exposed inner surface. Spring 35 is seated on flange 36 of casing inner wall 37 and engages magnetically susceptible cap 30 to urge it into contact with the lower end of operating plunger 29.

Detent mechanism 32 functions in a manner similar to that of detent mechanism 31, but for the fact that it utilizes spring loaded balls 38 which engage groove 39 in operating plunger 29a to establish a mechanical detent or latch.

It should be understood that the use of a magnetic detent coupled with a mechanical detent is an arbitrary combination and that the invention encompasses the use of dual magnetic, dual mechanical or even single detent assemblies.

In operation upon pivotal movement of lever 10 in a clockwise direction so as to move plunger assembly 8 to its operable position in order to allow work port 4 to communicate with pressure port 6, spring 35 urges magnetically susceptible cap 30 upward so that operating plunger 29 maintains contact with base 9 of control lever 10. As cap 30 and operating plunger member 29 near the top of their stroke, cap 30 engages and is held in position by magnet 34 of magnetic detent mechanism 31. Thus stroked plunger 8 is held in its operable position by detent mechanism 31.

Similarly, should control lever 10 be pivotally moved in a counter-clockwise direction so as to move plunger assembly 7 to its operable position, mechanical detent assembly 32 will engage plunger member 29a and maintain the operable position of stroked plunger assembly 7.

Whereby upon selection of a desired lever and plunger position, the detent assembly opposite the stroked plunger will be activated to maintain the selected position.

Various modes of carrying out the invention are contemplated as being within the scope of the following claims particularly pointing out and distinctly claiming the subject matter which is regarded as the invention.

We claim:

1. An improved detent mechanism for a lever operated hydraulic valve having a casing with first and second work ports; first and second valve means disposed to open and close the respective first and second work ports; first and second operating plunger members mounted for movement in the casing and engageable with first and second valve means; a lever pivotally connected to the casing and operably engaging the outer ends of the operating plunger members to allow pivotal movement of the lever in one direction to cause one of the operating plunger members to move inwardly toward a first position to operate the respective valve means and allows freedom of outward movement for the other operating plunger member toward a second position; the improvement comprising a first biasing member engaging the first operating plunger member to urge the first operating plunger member toward its second position; first detent means releasably engaging the first operating plunger member at its second position; a second biasing member engaging the second operating plunger member to urge the second operating plunger member toward its second position; second detent means for releasably engaging the second operating plunger member at its second position, said pivotal movement of the lever permits movement of one of the operating plunger members to its first position for opening one of the ports while the other operating plunger member is simultaneously moved independently of its associated valve means to its second position by its respective biasing member, and said other operating plunger member engages its respective detent means to establish a detent condition to hold the stroked operating plunger member and said lever in its operable position while allowing the non-stroked valve means to remain in its neutral position.

* * * * *